United States Patent
Lee (10) Patent No.: US 9,715,364 B2
(45) Date of Patent: Jul. 25, 2017

(54) SWITCHING DISPLAY MODES BASED ON CONNECTION STATE

(71) Applicant: Google Inc., Mountain View, CA (US)

(72) Inventor: Reena Singhal Lee, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/859,543

(22) Filed: Sep. 21, 2015

(65) Prior Publication Data

US 2016/0011841 A1  Jan. 14, 2016

Related U.S. Application Data

(63) Continuation of application No. 13/250,428, filed on Sep. 30, 2011, now abandoned, which is a continuation of application No. 12/943,444, filed on Nov. 10, 2010, now abandoned.

(60) Provisional application No. 61/377,673, filed on Aug. 27, 2010.

(51) Int. Cl.
  *G06F 3/14* (2006.01)
  *G06F 3/041* (2006.01)
  *G09G 5/00* (2006.01)

(52) U.S. Cl.
  CPC .......... *G06F 3/1423* (2013.01); *G06F 3/0416* (2013.01); *G09G 5/003* (2013.01); *G09G 2340/14* (2013.01); *G09G 2380/14* (2013.01)

(58) Field of Classification Search
  CPC ...... G09G 5/003; G06F 3/0416; G06F 3/1423
  See application file for complete search history.

(56) References Cited

U.S. PATENT DOCUMENTS

| | | | |
|---|---|---|---|
| 5,410,326 A | 4/1995 | Goldstein | |
| 5,818,425 A | 10/1998 | Want | |
| 5,880,732 A | 3/1999 | Tryding | |
| 6,348,956 B1 | 2/2002 | Tanigawa et al. | |
| 6,478,679 B1 | 11/2002 | Himoto et al. | |

(Continued)

FOREIGN PATENT DOCUMENTS

| | | |
|---|---|---|
| EP | 1858238 | 11/2007 |
| JP | 09244780 | 9/1997 |
| WO | 2009/143294 | 11/2009 |

OTHER PUBLICATIONS

Harris, Dorothy H., Office Action issued in U.S. Appl. No. 12/943,444 on Nov. 25, 2011, 23 pages.

(Continued)

*Primary Examiner* — Dorothy Harris
(74) *Attorney, Agent, or Firm* — Fish & Richardson P.C.

(57) ABSTRACT

Methods, systems, and apparatus, including computer programs encoded on a computer storage medium, for switching display modes based on connections between devices. In one aspect, it is determined that an external display has been connected to or disconnected from a mobile device. Based on the determining, an application executing on the mobile device is switched between a first display mode and a second display mode. In the first display mode, a single user interface is displayed on the touch screen of the mobile device. In the second display mode, a first user interface is displayed on the external display and a second user interface, for receiving user inputs, is displayed on the touch screen of the mobile device.

23 Claims, 8 Drawing Sheets

(56) References Cited

U.S. PATENT DOCUMENTS

| | | |
|---|---|---|
| 6,781,635 B1 | 8/2004 | Takeda |
| 6,947,975 B2 * | 9/2005 | Wong .................. H04L 69/329 |
| | | 709/208 |
| 6,966,837 B1 | 11/2005 | Best |
| 7,199,787 B2 | 4/2007 | Lee et al. |
| 7,624,210 B2 | 11/2009 | Izutsu |
| 7,835,505 B2 | 11/2010 | Toyama et al. |
| 7,877,703 B1 | 1/2011 | Fleming |
| 2001/0055951 A1 * | 12/2001 | Slotznick .............. H04M 1/215 |
| | | 455/41.3 |
| 2002/0102998 A1 | 8/2002 | Lin |
| 2002/0126997 A1 * | 9/2002 | Kunii .................... H04H 20/76 |
| | | 386/230 |
| 2002/0165028 A1 | 11/2002 | Miyamoto et al. |
| 2002/0190920 A1 | 12/2002 | Kung |
| 2003/0078038 A1 * | 4/2003 | Kurosawa .......... H04M 3/4938 |
| | | 455/422.1 |
| 2005/0262535 A1 * | 11/2005 | Uchida ................ H04N 7/163 |
| | | 725/80 |
| 2006/0085753 A1 | 4/2006 | Vance et al. |
| 2006/0259942 A1 * | 11/2006 | Toyama ............ H04M 1/72527 |
| | | 725/133 |
| 2007/0085759 A1 | 4/2007 | Lee et al. |
| 2007/0176787 A1 * | 8/2007 | Iten ........................ G08C 23/04 |
| | | 340/12.22 |
| 2007/0192806 A1 * | 8/2007 | Park ................ H04N 21/41407 |
| | | 725/80 |
| 2007/0203641 A1 | 8/2007 | Diaz et al. |
| 2007/0236482 A1 | 10/2007 | Proctor et al. |
| 2007/0265717 A1 | 11/2007 | Chang |
| 2008/0043020 A1 | 2/2008 | Snow et al. |
| 2008/0200154 A1 * | 8/2008 | Maharajh .......... G06F 17/30035 |
| | | 455/414.3 |
| 2008/0273015 A1 | 11/2008 | Huang et al. |
| 2009/0058822 A1 | 3/2009 | Chaudri |
| 2009/0077467 A1 * | 3/2009 | Adappa ................ G06F 3/0238 |
| | | 715/719 |
| 2009/0081950 A1 * | 3/2009 | Matsubara ............. H04H 60/80 |
| | | 455/3.06 |
| 2009/0174818 A1 | 7/2009 | Morita |
| 2009/0225039 A1 | 9/2009 | Williamson |
| 2009/0249359 A1 | 10/2009 | Caunter et al. |
| 2009/0280863 A1 * | 11/2009 | Shin ...................... G06F 1/1624 |
| | | 455/557 |
| 2009/0325607 A1 | 12/2009 | Conway et al. |
| 2010/0070162 A1 | 3/2010 | Aihara |
| 2010/0105370 A1 | 4/2010 | Kruzeniski et al. |
| 2010/0134385 A1 | 6/2010 | Roth et al. |
| 2010/0138780 A1 * | 6/2010 | Marano ................ G06F 3/1415 |
| | | 715/804 |
| 2010/0216508 A1 | 8/2010 | Ma et al. |
| 2010/0250816 A1 | 9/2010 | Collopy et al. |
| 2010/0261508 A1 | 10/2010 | Chang et al. |
| 2010/0262928 A1 | 10/2010 | Abbott |
| 2010/0299436 A1 * | 11/2010 | Khalid .................. G06F 1/1643 |
| | | 709/226 |
| 2010/0317332 A1 * | 12/2010 | Bathiche .............. H04L 12/282 |
| | | 455/418 |
| 2010/0330979 A1 * | 12/2010 | Harris ..................... H04L 63/08 |
| | | 455/420 |
| 2011/0025611 A1 | 2/2011 | Yoo et al. |
| 2011/0072394 A1 | 3/2011 | Victor |
| 2011/0134030 A1 | 6/2011 | Cho |
| 2011/0185390 A1 | 7/2011 | Faenger et al. |
| 2011/0205163 A1 | 8/2011 | Hinckley et al. |
| 2011/0227844 A1 | 9/2011 | Kim |
| 2011/0246904 A1 | 10/2011 | Pinto et al. |
| 2011/0252307 A1 | 10/2011 | Williamson et al. |
| 2011/0267291 A1 * | 11/2011 | Choi ...................... G06F 1/1692 |
| | | 345/173 |
| 2011/0301835 A1 * | 12/2011 | Bongiorno ........... G01C 21/343 |
| | | 705/6 |
| 2011/0302527 A1 * | 12/2011 | Chen ..................... G06F 3/0488 |
| | | 715/800 |
| 2012/0013541 A1 * | 1/2012 | Boka ..................... G06F 3/0488 |
| | | 345/173 |
| 2013/0016040 A1 * | 1/2013 | Ahn ....................... G06F 1/1654 |
| | | 345/163 |

OTHER PUBLICATIONS

Harris, Dorothy H., Office Action issued in U.S. Appl. No. 13/250,428 on Nov. 28, 2011, 25 pages.

Wolf, Lilian International Search Report issued in PCT/US2011/049286 on Oct. 21, 2011, 5 pages.

Wolf, Lilian, Written Opinion issued in PCT/US2011/049286 on Oct. 21, 2011, 6 pages.

Dinh, Duc Q., Office Action issued in U.S. Appl. No. 13/154,853 on Nov. 22, 2011, 9 pages.

Dinh, Duc Q., Office action issued in U.S. Appl. No. 13/249,375 on Nov. 23, 2011, 9 pages.

Harris, Dorothy H., Final Office Action issued in U.S. Appl. No. 12/943,444 on Apr. 16, 2012, 27 pages.

Harris, Dorothy H., Final Office Action issued in U.S. Appl. No. 13/250,428 on Apr. 9, 2012, 27 pages.

Harris, Dorothy H., Office Action issued in U.S. Appl. No. 12/943,444 on Oct. 28, 2013, 27 pages.

Harris, Dorothy H., Final Office Action issued in U.S. Appl. No. 12/943,444 on Mar. 12, 2014, 22 pages.

* cited by examiner

SWITCHING DISPLAY MODES BASED ON CONNECTION STATE

CROSS-REFERENCE TO RELATED APPLICATIONS

This application is a continuation of U.S. patent application Ser. No. 13/250,428, filed Sep. 30, 2011, which is a continuation application of U.S. patent application Ser. No. 12/943,444, filed Nov. 10, 2010, which claims priority to U.S. Provisional Application Ser. No. 61/377,673 filed on Aug. 27, 2010, the entire contents of which are incorporated herein by reference.

BACKGROUND

This specification relates to mobile devices.

Mobile devices, such as smart phones, personal digital assistants (PDAs), and the like, typically include touch screen displays that can display information to a user. Through a touch screen display of a mobile device, a user can provide input to the mobile device, in response to which the mobile device can display information. In several situations, the mobile device simultaneously displays information on and enables users to provide inputs through the touch screen display.

Mobile devices are often sized to fit in a user's palm. Consequently, the size of the touch screen display that a mobile device includes is small relative to, for example, a computer monitor or a television screen. Also, in some situations, there may be limitations on the display characteristics of the touch screen display due to constraints on a number and/or size of components that can be installed in the mobile device. The small size of mobile device touch screen displays makes it difficult to simultaneously display information and receive user inputs.

SUMMARY

In general, one innovative aspect of the subject matter described in this specification can be embodied in processes for switching display modes of a mobile device (or of an application running on the mobile device), based on the state of a connection between the mobile device and an external display. When the mobile device and the external display are disconnected, the mobile device can display a single user interface on, and can receive inputs through, its touch screen. When the mobile device and the external display are connected, the mobile device can display a user interface on, and can receive inputs through, its touch screen, and can display a different, user interface on the external display. When connected, the user interface on the touch screen can display controls which help the user to provide inputs, while user interface on the external display can be the primary user interface for the application.

In general, another innovative aspect of the subject matter described in this specification can be embodied in methods that include the actions of determining that an external display has been connected to or disconnected from a mobile device, and based on determining that the external display has been connected to or disconnected from the mobile device, switching an application executing on the mobile device between a first display mode in which the application generates a single user interface for display on a touch screen of the mobile device, and a second display mode in which the application generates a first user interface for display on the external display and a different, second user interface for display on, and for receiving user inputs through, the touch screen of the mobile device.

Other embodiments of these aspects include corresponding systems, apparatus, and computer programs, configured to perform the actions of the methods, encoded on computer storage devices.

These and other embodiments can each optionally include one or more of the following features. In various examples, determining that an external display has been connected to or disconnected from a mobile device further comprises determining that the external display has been connected to the mobile device, and switching an application further comprises switching the application from the first display mode to the second display mode; determining that the external display has been connected to or disconnected from the mobile device further comprises determining that the external display has been disconnected from the mobile device, and switching an application further comprises switching the application from the second display mode to the first display mode; displaying, on the touch screen of the mobile device in the first display mode, a visual element and a first set of controls for receiving user inputs to control the visual element, displaying, on the external display in the second display mode, the visual element, and displaying, on the touch screen of the mobile device in the second display mode, a second set of controls for receiving the user inputs to control the visual element; the second set of controls includes controls that are not included in the first set of controls; the second set of controls includes all controls of the first set of controls and additional controls; and/or the actions include, in the first display mode, displaying a control in a first size, and in the second display mode, displaying the control in a second size that is larger than the first size.

Particular implementations of the subject matter described in this specification can be implemented so as to realize one or more of the following advantages. A mobile device can display a user interface on its touch screen for the purpose of aiding or encouraging user input. At the same time, a different user interface can be displayed on an external display, as the primary user interface for an application running on the mobile device. Because the external display can be larger or can include different display characteristics than the touch screen, the user can have a better experience when running the application with a connected external display, than they would by running the application on the mobile device alone. Controls displayed on the touch screen can guide or otherwise inform the user when interacting with the touch screen.

Furthermore, a user does not need to restart an application in order to display the user interface of a mobile device application on the external display. Rather, by connecting the mobile device and the external display, not only can the user view a user interface on the external display, but the user can also control the user interface displayed on the larger external display through interactions with the touch screen of the mobile device. Because the mobile device can be designed to be held in a user's hand, the user can find it easier to provide inputs through the touch screen of the mobile device than through some other input mechanism. All of these advantages can enhance the user experience when the user invokes gaming, navigation, media playing, or other types of applications.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
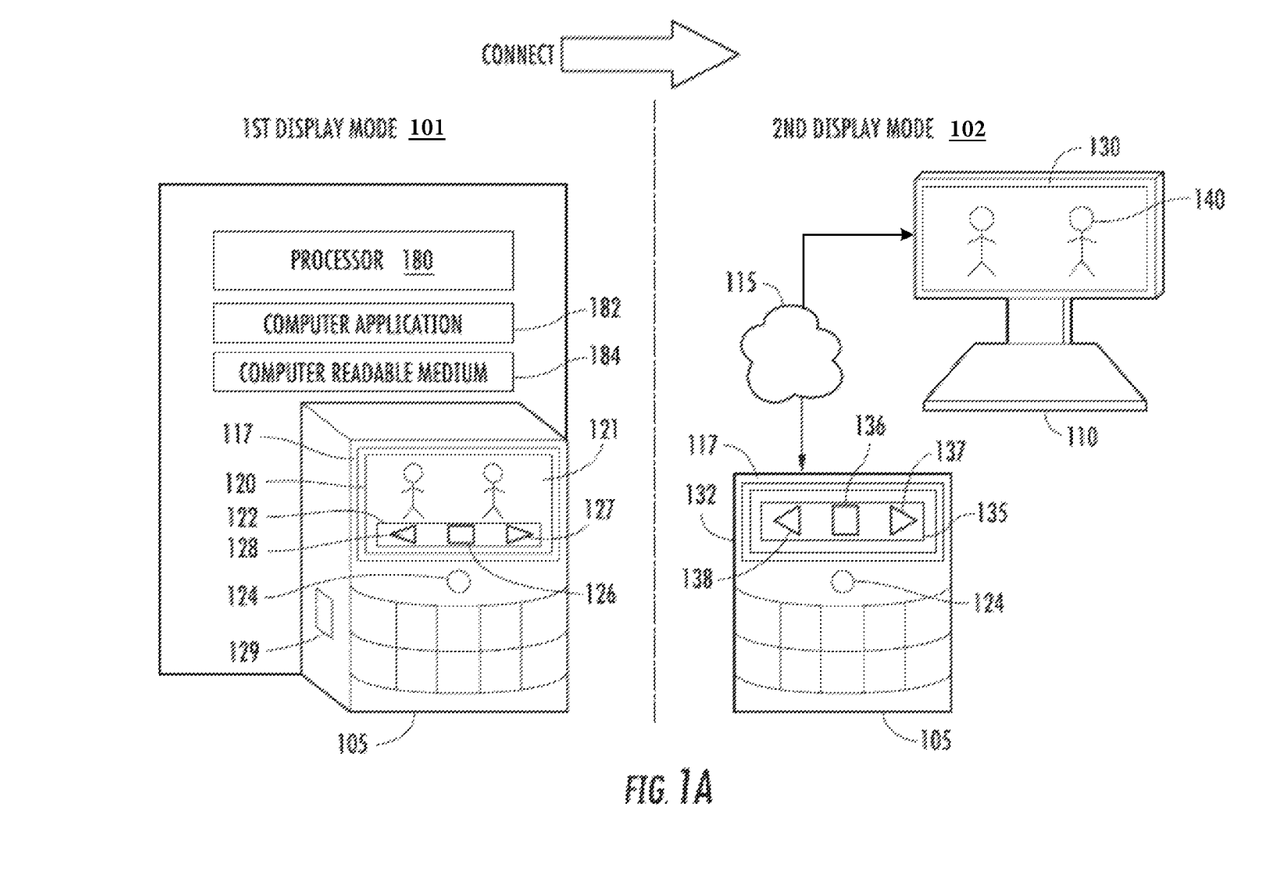
FIGS. 1A-B, 3A-B, 4A-B, 5 and 6 illustrate example mobile devices.

FIG. 1A illustrates an example mobile device 105. Among other components, the mobile device 105 includes a touch screen 117 and one or more processors 180 that execute a computer application 182. In some implementations, the mobile device 105 can additionally include a hardware controller 124 (e.g., trackball, a track pad, a keyboard, or a mouse). The mobile device 105 can be, for example, a personal digital assistant (PDA), smart phone, navigation system, music player, tablet computer, e-book reader, or any other type of computing device.

As used by this specification, a "touch screen" (or "touchscreen," or "touch screen display") is an electronic visual display that can detect the presence and location of a touch within the display area. The touch, which defines a user input, can occur using a finger, hand, stylus light pen, or other object. The touch can represent a single touch at a particular location on the touch screen 117, or the touch can represent a movement, or "swipe," across multiple locations on the touch screen 117. The user can touch the touch screen 117 to control the application.

Although the touch screen 117 and the external display 110 are both output devices for displaying visual information, the external display 110 is different from the touch screen 117 because it is a peripheral device that is connected to the mobile device 105 through an outside or outer part of the mobile device 105. For example, the external display 110 can be connected to the mobile device 105 through an external interface or port 129, while the touch screen 117 is built in to the mobile device 105. Because the external display 110 is not constrained internal to the mobile device 105 and is therefore not constrained by the size of the mobile device 105, the external display 110 can be larger than, or can include improved display characteristics over, the touch screen 117.

The application can be, for example, a media playing application, a gaming application, a navigation application, a text editor, or any other application. The application can generate and display one or more user interfaces on the touch screen 117. When the mobile device 105 is connected to the external display 110, the application can display one or more user interfaces on each of the touch screen 117 and/or the external display 110. Each user interface is made up of one or more graphical or textual elements, which are referred to collectively by this specification as "visual elements").

The application running on the mobile device 105 (or the mobile device 105 itself) is capable of operating in two or more different display modes (e.g., first display mode 101 and second display mode 102), which are manually or automatically selected based at least upon whether the mobile device 105 is connected to or disconnected from the external display 110. Depending upon which mode is selected, the application can output a single user interface for display on the touch screen 117, or the application can output a user interface for display on the touch screen 117 for receiving user inputs, and can output another, different user interface for display on the external display 110 as the primary user interface for the application. The application receives user inputs through the touch screen 117 and/or hardware controllers 124. The primary user interface is a user interface within which the application displays the outputs (e.g., visual elements) generated in response to the user inputs.

The application can run in the first display mode 101 when the mobile device 105 is not connected to the external display 110, i.e., when the mobile device 105 is disconnected from the external display 110. The application can determine that the mobile device 105 is not connected to the external display 110 based on receiving a signal that indicates that no external display 110 is connected or that a port through which the external display 110 would be connected is not being used, or based on not receiving a signal that would indicate that an external display 110 is connected or that a port 129 through which the external display would be connected is being used. Alternatively, the application can prompt the user to specify whether the mobile device is or is not connected to the external display 110.

In the first display mode 101, the application generates a single user interface 120, and displays the user interface 120 on the touch screen 117. The user interface 120 includes one or more visual elements 121, which can include video, still and/or animated images, graphics, game components, interactive street maps, text, or combinations thereof. Generating a single user interface can include generating one or more user interfaces for display on a single display, but does not include generating a user interface for display on multiple displays, or generating different user interfaces for display in multiple displays.

Among the many visual elements displayed in the user interface 120, the application displays a set of controls (for example, controls 122) that, along with hardware controller 124, can be used to receive user inputs. In this situation, because the application is a media playing application, the set of controls 122 can include a "START/PAUSE" button 126, a "FORWARD" button 127, and a "REWIND" button 128. Other applications can use different types of controls.

The mobile device 105 transitions from the first display mode 101 to the second display mode 102 when the external monitor 110 is connected to the mobile device 105. Even after detecting the connection, the application can require confirmation from the user of the mobile device 105 before transitioning from the first display mode 101 to the second display mode 102. The connection 115 between the mobile device 105 and the external monitor 110 can be a wireline connection (e.g., through a Digital Visual Interface (DVI) connection) or through a wireless connection (e.g., through a BLUETOOTH interface).

The application can determine that the mobile device 105 is connected to the external display 110 based on receiving a signal that indicates that the external display 110 is connected or that a port 129 through which the external display 110 would be connected is being used, or based on not receiving a signal that would indicate that an external display 110 is disconnected or that a port 129 through which the external display would be connected is not being used. Alternatively, the application can prompt the user to specify whether the mobile device 105 is or is not connected to the external display 110.

In the second display mode 102, the application generates at least two user interfaces: user interface 130, which the mobile device 105 displays on the external display 110 and user interface 132, which the mobile device displays on the touch screen 117. The user interfaces 130 and 132 are different from each other, and are each different from the user interface 120.

In the second display mode 102, the application displays one or more visual elements (e.g., visual elements 140), which can include video, still and/or animated images, graphics, game components, interactive street maps, text, or combinations thereof. Because the user interface 130 is the primary user interface for the application in the second display mode, the visual elements 140 displayed in the user interface 130 in the second display mode 102 can include some or all of the visual elements (e.g., visual elements 121) that were displayed in the user interface on the touch screen 117 in the first display mode 101. When the external display 110 is larger than the touch screen 117 (or otherwise has different, e.g., an improved, display characteristic, relative to the touch screen 117), the visual element 140 can be displayed in a different, e.g., more visually pleasing, manner in the second display mode 102, than the visual element 121.

In the second display mode 102, the application also generates a user interface 132, which the application displays on the touch screen 117. In the second display mode 102, the application can receive inputs through a set of controls 135 that the application displays in the user interface 132, as well as through the hardware controller 124. Whereas, in the first display mode 101, the application displayed both the visual elements and the controls 122 in the touch screen 117, in the second display mode 102, the application can display other controls (e.g., set of controls 135) in the touch screen 117 because the application has moved certain visual elements to the external display. For example, the set of controls 135 can include a "START/PAUSE button" 136, a "FORWARD" button 137, and a "REWIND" button 138.

Because the application can display such other controls in the touch screen 117 in the second display mode 102, an input to control a visual element 121 that would have been received through the hardware controller 124 in the first display mode 101 can be received, instead, through the touch screen 117 in the second display mode 102 using the set of controls 135. Further, because the application can display other visual elements (e.g., same as or different from visual element 140) in the user interface 130 displayed on the external display 110, the application can display fewer visual elements in the user interface 132. For example, the application can display only the "START/PAUSE button" 136, the "FORWARD" button 137, and the "REWIND" button 138 on the user interface 132.

Furthermore, the user interfaces 132 or 140 can display a control (or a corresponding set of controls) with a size, shape, color, pattern, or other characteristic that is different than a corresponding control from the user interface 120, which can be larger or smaller than the first size. For example, the set of controls 122 and the set of controls 135, each include a "START/PAUSE button", a "FORWARD" button, and a "REWIND" button. However, the "START/PAUSE button" 136 is larger in size than the "START/PAUSE" button 126, the "FORWARD" button 137 is larger than the "FORWARD" button 127, and the "REWIND" button 138 is larger than the "REWIND" button 128. In other words, in the user interface 132, the set of controls 135 can be displayed in a larger size relative to the touch screen 117 because the application has to display fewer visual elements within the touch screen 117. Doing so can make it easier for a user to interact with the user interface 132, especially on small screen mobile devices.

The mobile device 105 transitions from the second display mode 102 to the first display mode 101 when the external monitor 110 is disconnected from the mobile device 105. Even after detecting the disconnection, the application can require confirmation from the user of the mobile device 105 before transitioning from the second display mode to the first display mode. Disconnection can occur by detaching a cable (in the context of a wireline connection) or by terminating a BLUETOOTH connection or by disabling a transmitter (in the context of a wireless connection).

The application can determine that the mobile device 105 is disconnected from the external display 110 based on receiving a signal that indicates that no external display is connected or that a port 129 through which the external display would be connected is not being used, or based on not receiving a signal that would indicate that an external display is connected or that a port 129 through which the external display would be connected is being used. Once transitioned to the first display mode 101, the application stops displaying the first user interface 130 on the external display 110 and the second user interface 132 on the touch screen 117, and displays the single user interface 120 on the touch screen 117 instead.

Figure 1B:
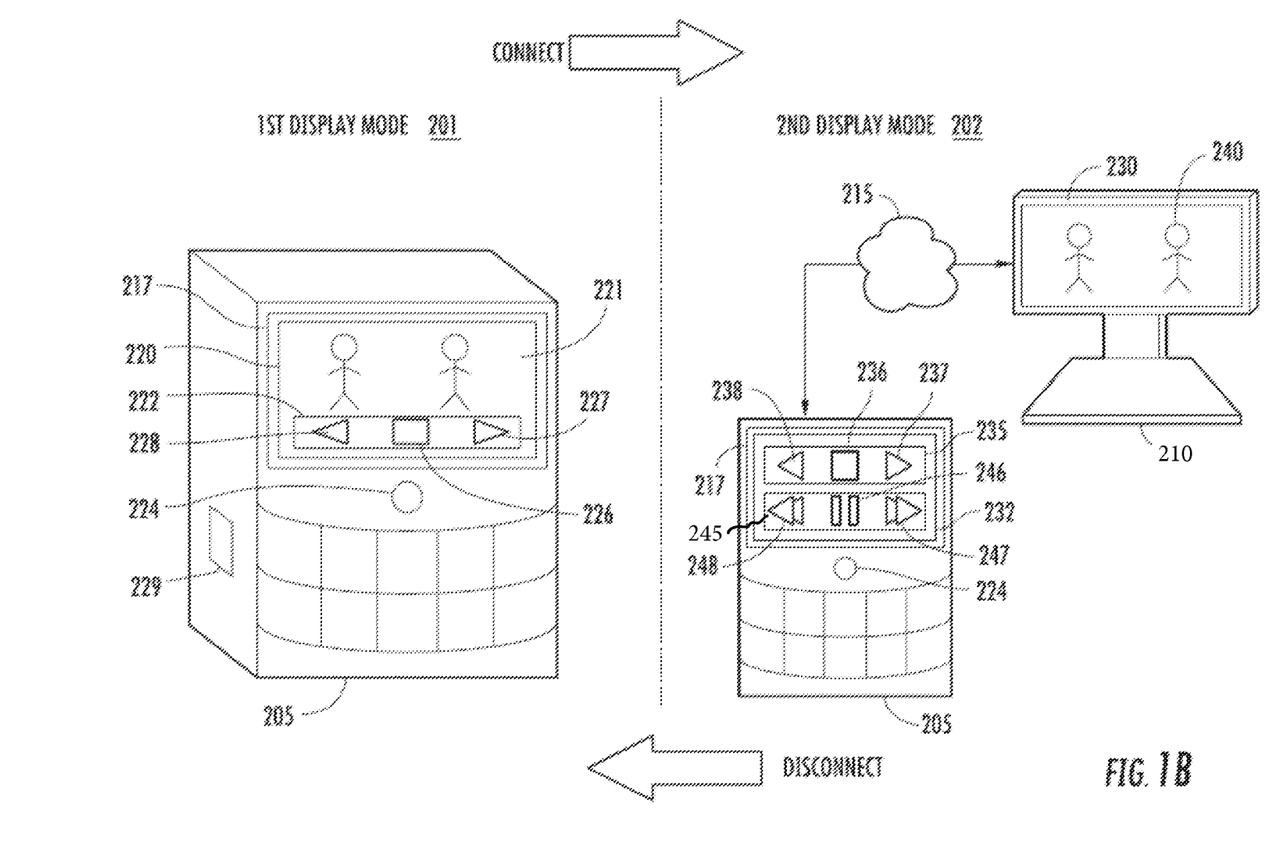

FIG. 1B illustrates an example mobile device 205. In the first display mode 201, a media player application executing on the mobile device 205 generates a single user interface 220 and displays the user interface 220 on the touch screen 217. In addition, the media player application generates a set of controls 222 that include, for example, a "START/PAUSE" button 226, a "FORWARD" button 227, and a "REWIND" button 228. A user can provide input to view the media, for example, video content, using the set of controls 222 displayed on the touch screen 217.

When the mobile device 205 is connected to the external display 210 over the connection 215, through the port 229, the application switches the media player application to the second display mode 202. In the second display mode 202, the media player application generates a first user interface 230 which the mobile device 205 displays on the external display 210. Within the first user interface 230, the media player application displays visual elements (e.g., visual element 240) that the media player application displayed in user interface 220 in the first display mode 201. Further, the media player application generates a second user interface 232 that the mobile device 205 displays on the touch screen 217. Because the media player application displays visual elements on the external display 210, the media player application is provided with more space to display other visual elements and controls in the second user interface 232.

Also, the media player application can generate two sets of controls 235 and 245, and display both sets in the second user interface 232. Because more space is available on the touch screen 217 to the media player application, the application can display more controls on the touch screen 217 in the second display mode 202 than the application could in the first display mode 201. Consequently, the set of controls 235 can include all controls that are included in the set of controls 222 and the set of controls 245 can include additional controls. Alternatively, or in addition, in the second display mode 202, the application can generate a single set of controls that includes the controls displayed in the first display mode 201 and additional controls. For example, the set of controls 235 can include a "START/PAUSE" button 236, a "FORWARD" button 237, and a "REWIND" button

238. Additionally, the set of controls 245 can include, for example, a "RECORD" button 246, a "SKIP CHAPTER FORWARD" button 247, and a "SKIP CHAPTER BACKWARD" button 248.

Thus, in a first display mode 201, space constraints can limit a number of controls that can be displayed in the touch screen 217 of the mobile device 205 to display controls through which a user can provide inputs to control the visual elements. In the second display mode 202, when the mobile device 205 is connected to the external display 210, the space constraints are relaxed and more space is provided to the media player application to display controls. For example, a number of controls using which a user can provide inputs to the media player application increases when the mobile device 205 is connected to the external display 210. Consequently, whereas it was possible to display only a certain number of controls while operating the mobile device 205 in the first display mode 201, it becomes possible to display more controls while operating the mobile device in the second display mode 202.

Figure 2:
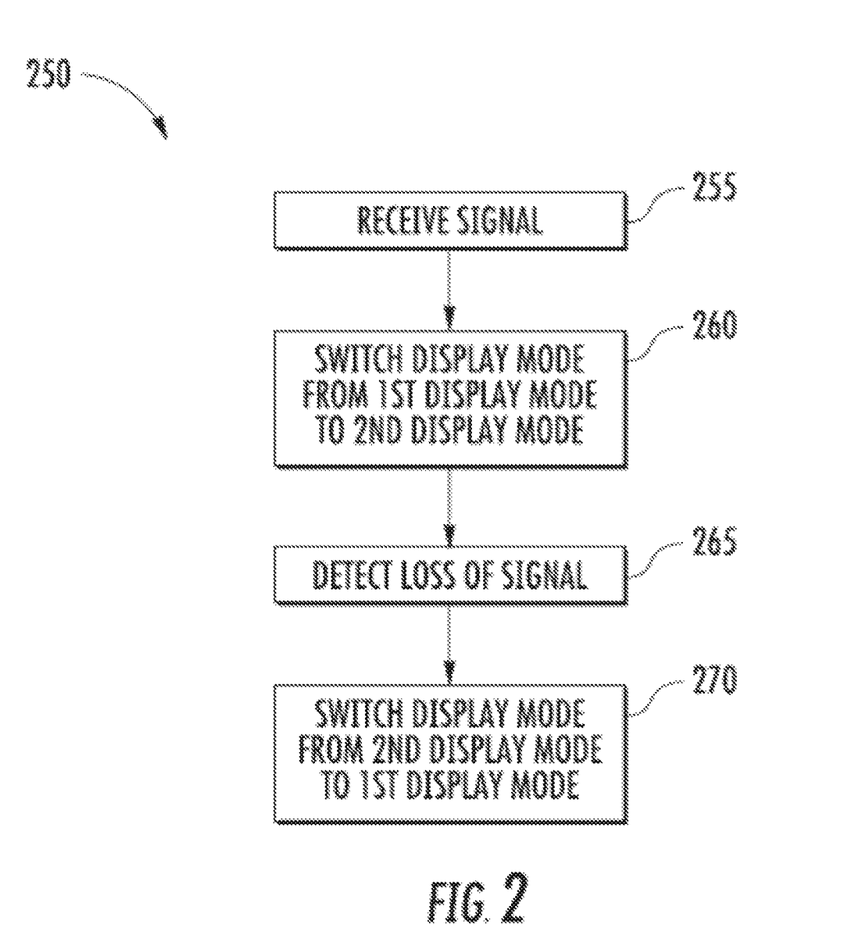
FIG. 2 is a flowchart of an example process.

FIG. 2 is a flowchart of an example process 250. Briefly, the process 250, which can be executed by one or more computers that are configured to execute computer software instructions, includes the actions of determining that an external display has been connected to or disconnected from a mobile device, and based on determining that the external display has been connected to or disconnected from the mobile device, switching an application executing on the mobile device between a first display mode in which the application generates a single user interface for display on a touch screen of the mobile device, and a second display mode in which the application generates a first user interface for display on the external display and a different, second user interface for display on, and for receiving user inputs through, the touch screen of the mobile device.

When the process 250 begins, it is determined that an external display has been connected to a mobile device (255). For example, the application receives a signal indicating that an external display has been connected to the mobile device. Alternatively, or in addition, the application executing on the mobile device stops receiving a signal that would indicate that an external display is disconnected or that a port through which the external display would be connected is not being used. Further, the application determines that the external display has been connected to the mobile device upon receiving a signal from the user indicating that the mobile device is connected to the external display.

Based on determining that the external display has been connected to the mobile device, an application executing on the mobile device is switched from a first display mode in which the application generates a single user interface for display on a touch screen of the mobile device, to a second display mode in which the application generates a first user interface for display on the external display and a different, second user interface for display on, and for receiving user inputs through, the touch screen of the mobile device (260).

In some implementations, a mobile device can be connected to the two external displays. In such implementations, the application can be switched from the first display mode to a second display mode in which the application displays two second user interfaces on the two external displays. The two second user interfaces can be identical to each other. Alternatively, in some implementations, the application can be switched to a second display mode in which the application displays a second user interface in one of the external displays and displays a third user interface in the other external display. The second user interface and the third user interface can each display different visual elements.

In some implementations, when the application determines the connection between the mobile device and the external display, the application can receive display characteristics of the external display, e.g., screen resolution, screen size, and the like. In response, the application can generate a second user interface that the application determines as being optimal for an external display having the received display characteristics. For example, if the screen size of the external display is larger than that of the touch screen, then the application can generate controls that are larger than the controls displayed in the touch screen of the mobile device.

In some implementations, when the application determines the connection between the mobile device and the external display, the application can additionally determine if the external display is configured to receive user inputs. For example, the application can receive one or more signals from the external display indicating that the external display includes a touch screen through which the external display can receive inputs. In response, the application can generate visual elements and controls for display in the second user interface. For example, the application can display a first set of controls on the touch screen of the mobile device and a second, additional set of controls on the touch screen of the external display.

It is determined that the external display has been disconnected from the mobile device (265). For example, the application can determine that the mobile device is disconnected from the external display based on receiving a signal that indicates that no external display is connected or that a port 229 through which the external display would be connected is not being used, or based on not receiving a signal that would indicate that an external display is connected or that a port 229 through which the external display would be connected is being used.

Based on determining that the external display has been disconnected from the mobile device, the application is switched from the second display mode to the first display mode (270), thereby ending the process 250. For example, the mobile device can detect that a signal that previously indicated that a connection was established now has been lost. Specifically, the application can detect that a Bluetooth connection through which the mobile device and the external display were paired has been terminated. Alternatively, the application can detect that a signal received through the cable that connected the port 229 of the mobile device to the external display is no longer received. Further, when power to the external display is turned off in a second display mode, the application can automatically switch the application to the first display mode.

Figure 3A:
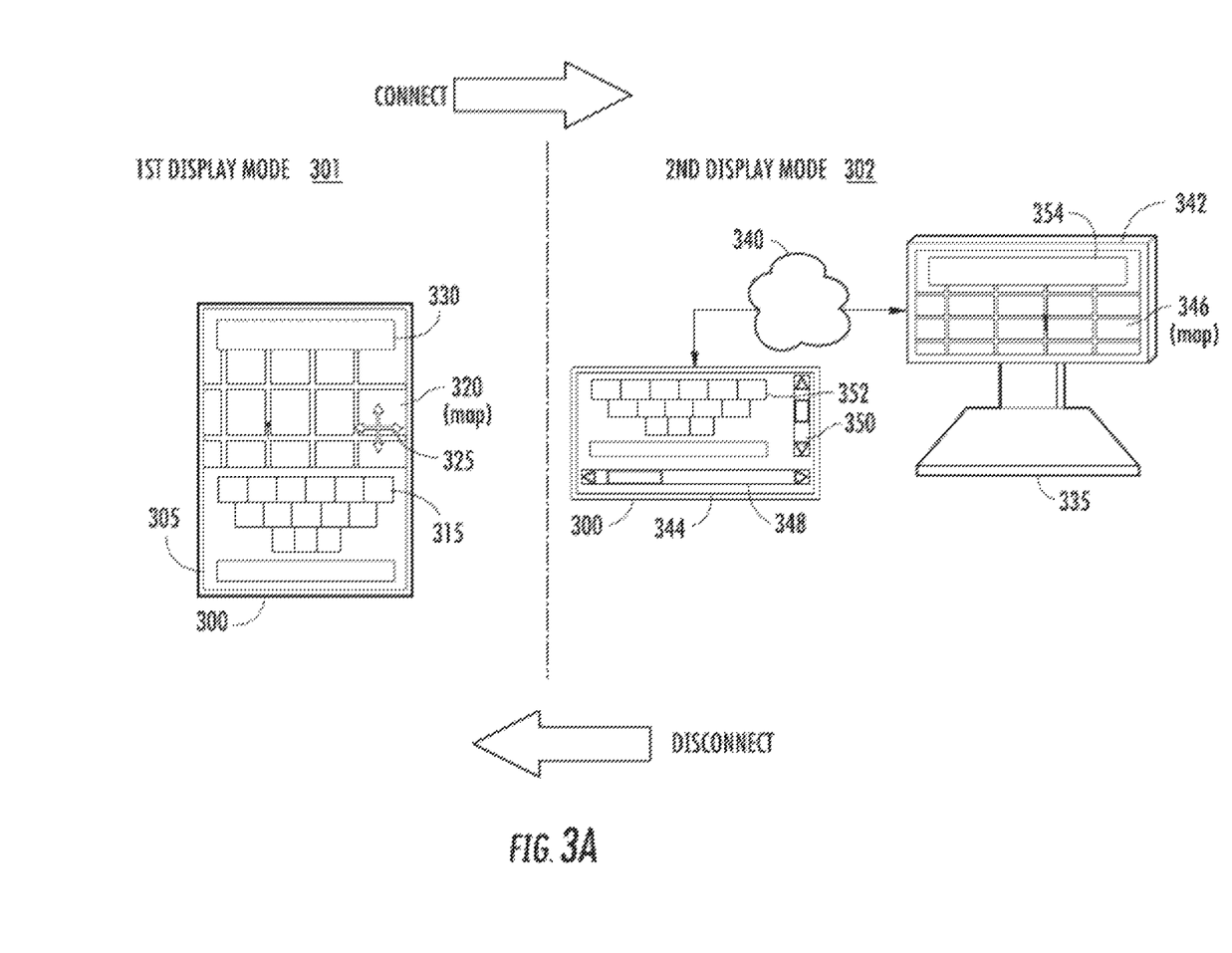
Figure 3B:
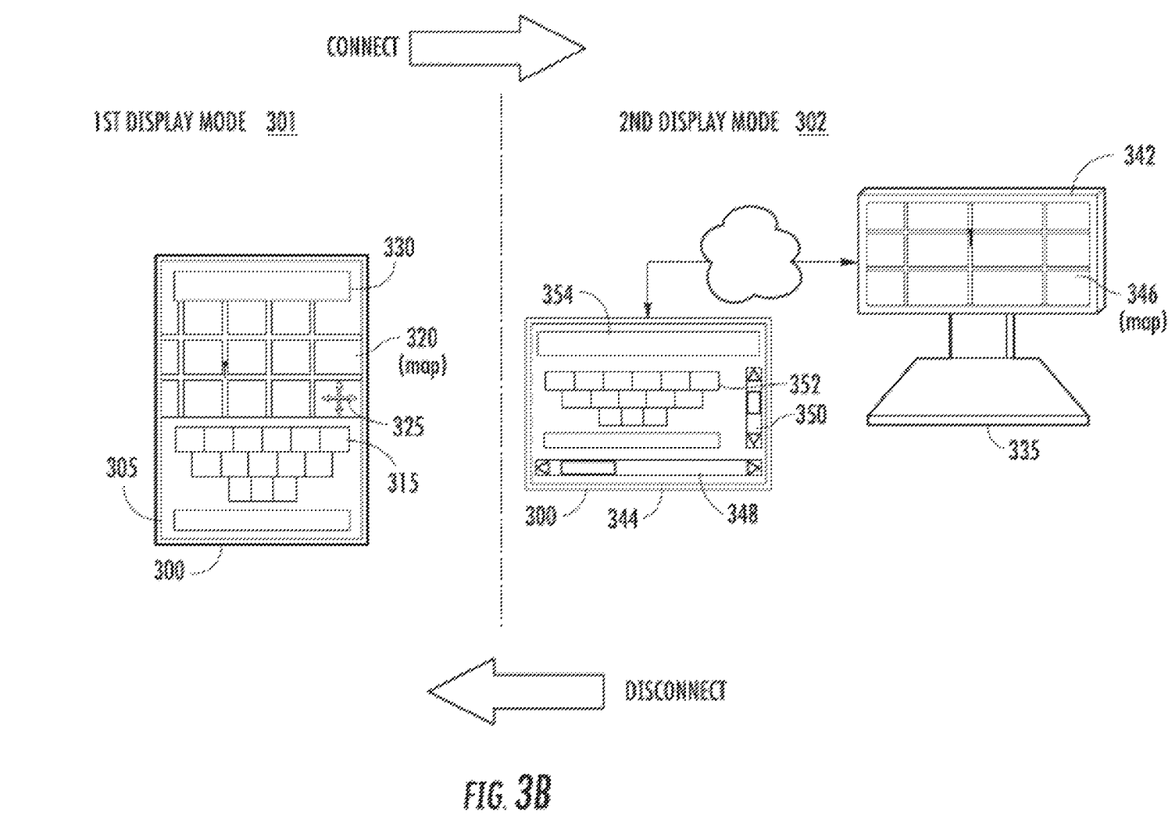

FIGS. 3A-B illustrate an example mobile device 300. In the first display mode 301, a navigation application generates a single user interface 305 that the mobile device displays on the touch screen of the mobile device 300. Further, the navigation application generates and displays one or more visual elements, for example, visual element 320, within the user interface 305. For example, the visual element 320 represents an interactive street map. The navigation application displays the interactive street map in the user interface 305.

Further, the navigation application generates a set of controls (controls 315, 325, 330) that the mobile device 300 displays in the user interface 305. A user can use the set of controls to provide input to interact with the visual element 320. For example, the set of controls include a keyboard control 315. A user can input text using the keyboard control 315. In the context of a navigation application, the user can use the keyboard control 315 to input addresses.

The navigation application can identify the location specified by the address and display an identifier marking the location on the visual element 320 corresponding to the interactive street map. In some implementations, the mobile device 300 includes a touch screen configured to receive user inputs such as a finger swipe. By swiping a finger across the visual element 320 representing the interactive street map, the user can navigate the street map. In some implementations, the set of controls can include a directionality control 325 that can include, for example, controls representing arrows. The mobile device 300 can receive user inputs through the directionality controls 325 to navigate the interactive street map. In some implementations, the navigation application can generate and display in the user interface 305, another visual element 330 representing a text box. The address that the user inputs through the keyboard control 315 can be displayed in the visual element 330 representing the text box.

When the mobile device 300 is connected to the external display 335, the navigation application switches to a second display mode 302. In the second display mode 302, the navigation application generates and displays a first user interface 342 on the external display 335. Further, the navigation application generates and displays a second user interface 344 on the touch screen of the mobile device 300. In the first user interface 342, the navigation application displays a visual element 346 representing the interactive street map. Further, the navigation application displays a visual element 354 representing a text box in which the navigation application displays the address that the user has provided.

In the second user interface 344, the navigation application displays a set of controls (controls 348, 350, 352). The control 352 is a keyboard control similar to the control 315 displayed in the first display mode 301. The controls 348 and 350 represent sliding bars using which the user can interact with the visual element 346 representing the interactive street map, for example, in lieu of the finger swiping input with which the user interacted with the interactive street map in the first display mode 301. Thus, in some implementations, the controls in the second set of controls in the second display mode 302 can include controls that are not included among the set of controls in the first display mode 301. In alternative implementations, as shown in FIG. 3B, the navigation application can display the visual element 354 representing the text box in the second user interface 344 displayed on the touch screen of the mobile device 300.

Further, in some implementations, the navigation application can display the user interface, the visual elements, and the controls in a portrait orientation in the first display mode 301. In such implementations, in the second display mode 302, the navigation application can display the user interface, the visual elements, and the controls in a landscape orientation.

In this manner, the mobile device 300 can be used to control an interactive street map displayed on the external display 335 to which the mobile device 300 is connected. For example, a user can execute the navigation application on the mobile device 300 that is not connected to any external display. In such a situation, the user can input an address using the controls 315, for example, and view an interactive street map 320 on the touch screen of the mobile device 300.

When the user connects the mobile device 300 to the external display 335, for example, a display screen of an in-car navigation system, the display screen of the in-car navigation system displays the interactive street map and the mobile device 300 displays controls to input an address on the touch screen of the mobile device 300. Thus, by connecting the mobile device 300 to the in-car navigation system, the user can use the mobile device 300 to control and interact with the street map.

Figure 4A:
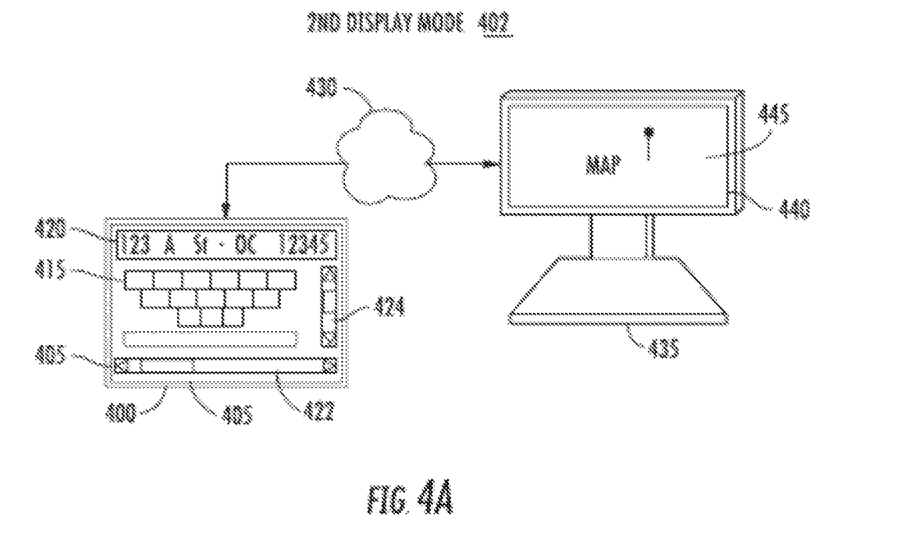
Figure 4B:
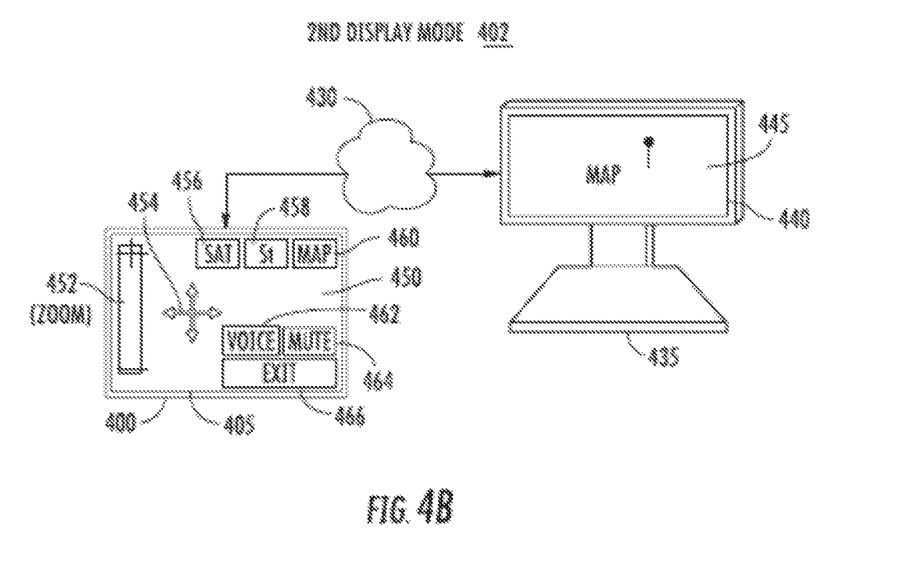

FIGS. 4A-B illustrate an example mobile device 400. Similar to the second display mode 302 described with reference to FIGS. 3A-B, the mobile device 400 detects a connection 430 between the mobile device 400 and an external display 435. The mobile device 400 switches the display mode of a navigation application from a first display mode to a second display mode 402 in which the navigation application displays a visual element 445 representing an interactive street map in the user interface 440 on the external display 435.

In some implementations, the visual elements and controls that the navigation application displays in a user interface on the touch screen 405 can be similar to those that the navigation application displays in the user interface on the touch screen 405 in the first display mode. Therefore, for example, in both the first and second display modes, the navigation application can display a keyboard control 415, and a visual element 420 representing a textbox. In addition, in the second display mode 402, the navigation application can display scroll bar controls 422 and 424.

In some implementations, when the navigation application switches the navigation application from the first display mode to the second display mode 402, the navigation application generates and displays a set of controls on the touch screen of the mobile device 400 that are entirely different from the set of controls that the navigation application generates and the mobile device displays in the first display mode. For example, as described with reference to FIG. 4B, the navigation application displays multiple controls in the user interface 450 on the touch screen 405.

The multiple controls can include a "SAT" button 456 through which the mobile device 405 receives input to display a visual element 445 representing a satellite image of the interactive street map in the external display 435. The controls can also include a "STREET" button 458 through which the mobile device 405 receives input to display another visual element representing a street view of a location on the interactive street map. The controls can further include a "MAP" button that can return the display on the external display 445 to a map view from a street view.

In some scenarios, the mobile device 400 can include voice functionalities through which input to control the navigation application can be received. The controls can include a "VOICE" button and a "MUTE" button, through which the user can provide input to activate and de-activate the voice functionalities, respectively. Further, the controls can include zoom buttons 452 and 454, an "EXIT" button 466, and the like.

Figure 5:
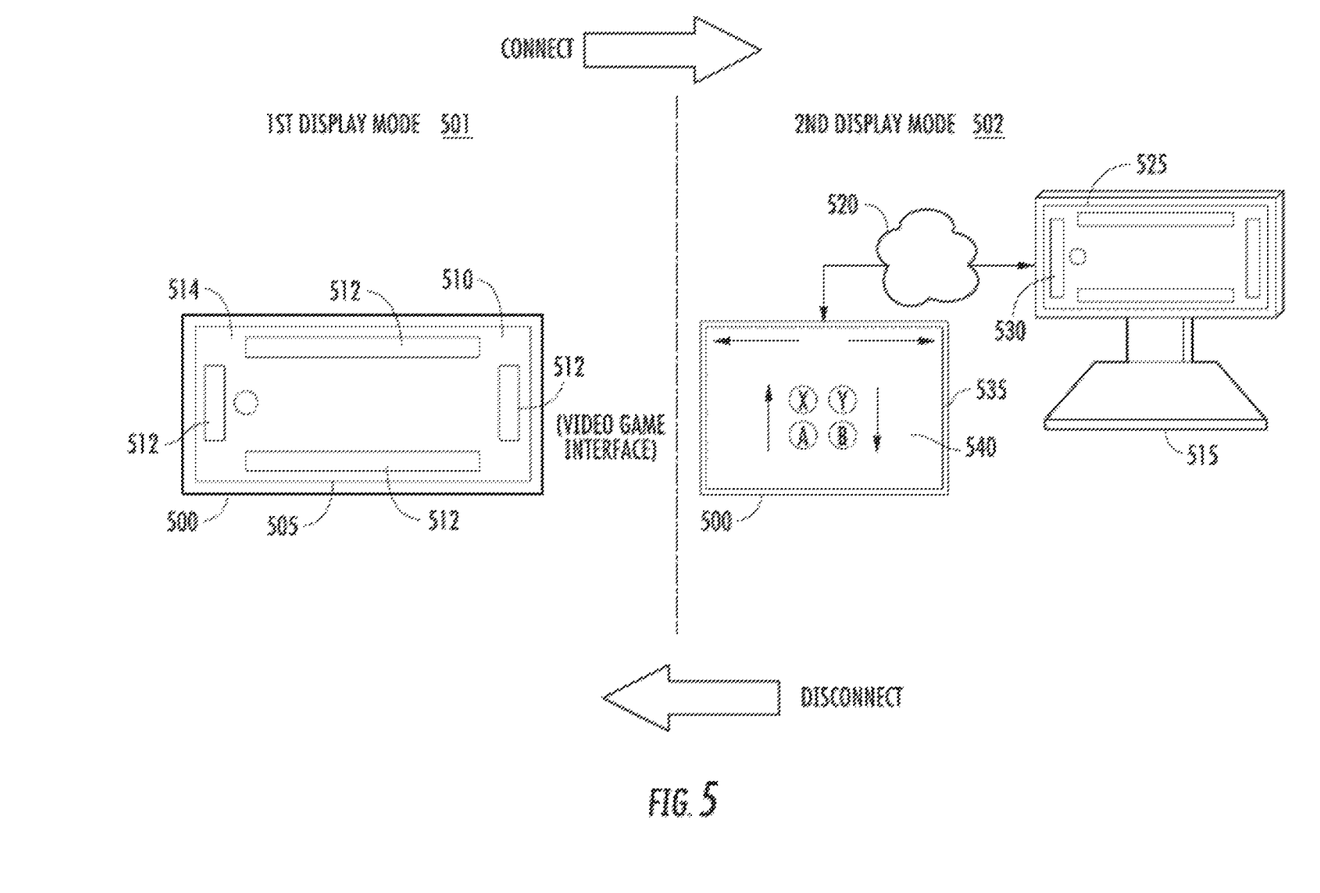

FIG. 5 illustrates an example mobile device 500. The mobile device 500 can execute a gaming application in a first display mode 501 and a second display mode 502. In the first display mode 501, the gaming application generates a single user interface 510 that the mobile device 500 displays on the touch screen 505. Further, the gaming application generates a set of controls 512 through which inputs are received to control a visual element 514 that the gaming application generates.

In some implementations, as an alternative or in addition to the set of controls 512, a user can control the visual element 514 directly by touching the visual element 514 or other portions of the user interface 510. Thus, in the first display mode 501, the gaming application generates and displays a video game interface on the touch screen 505.

When connected to an external display 515, the gaming application determines that a connection 520 to the external display 515 exists, and switches from the first display mode 501 to the second display mode 502. In the second display mode 502, the gaming application generates and displays a first user interface 525 on the external display 515. In this user interface 525, the gaming application displays the video game interface that the mobile device 500 displayed on the touch screen 505 in the first display mode 501. Further, the gaming application generates and displays a second user interface 535 on the touch screen 505.

In the second display mode 502, the gaming application can generate display a set of controls 540 that include multiple control buttons and visual elements representing arrows pointing in different directions. Because the video game interface is displayed in the external display 515, the visual elements that are to be controlled as part of the gaming experience need no longer be displayed on the touch screen of the mobile device 500.

Instead, the set of controls 540 that the mobile device 500 displays on the touch screen 505 of the mobile device 500 can be used to control the visual elements 530 displayed in the external display 515. Thus, when the mobile device 500 executes a gaming application and the mobile device 500 is connected to an external display 515, the mobile device 500 can be used as a controller to control visual elements displayed in a video game interface displayed in the external display 515.

Figure 6:
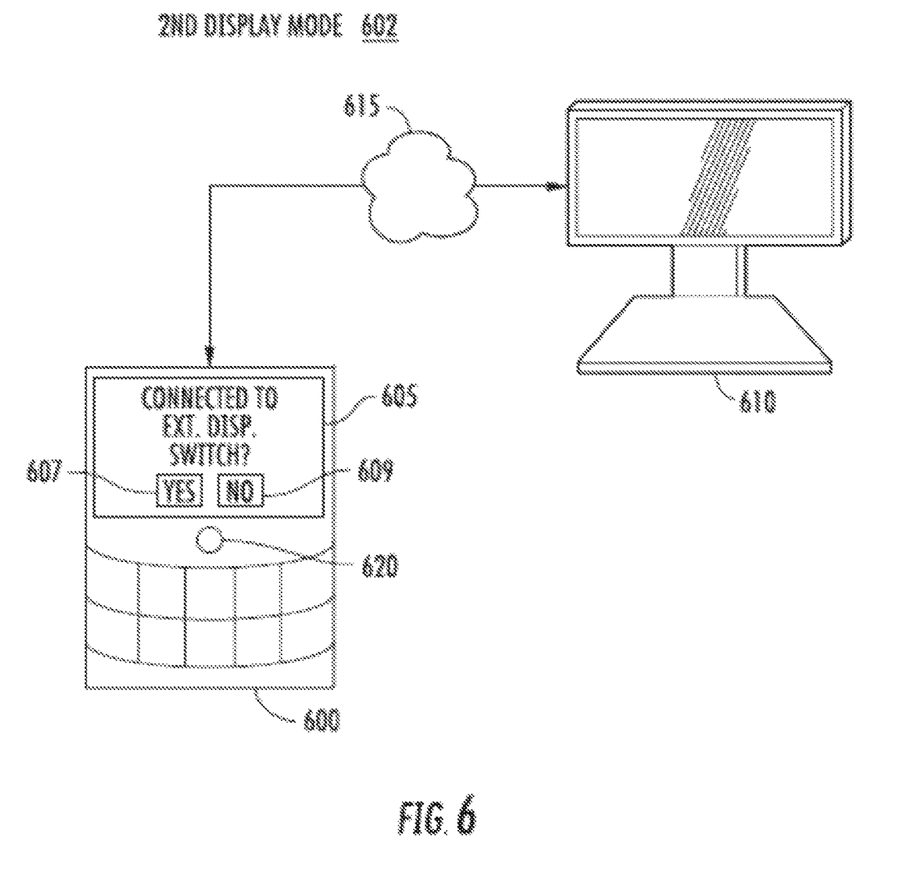

FIG. 6 illustrates an example mobile device 600. An application executing on the mobile device 600 requests permission to switch from a first display mode to a second display mode 602. In some situations, the mobile device 600 can be in an environment of one or more external displays with which the mobile device 600 can automatically be paired, e.g., through a BLUETOOTH connection. However, the user may not always desire such a pairing, but rather may desire to continue to operate the mobile device 600 in a first display mode even when the mobile device 600 can be operated in the second display mode. In such situations, the application requests permission to switch from the first display mode to the second display mode to ensure that the user desires such a switch.

The mobile device 600 can include a touch screen 605 and hardware controllers 620 through which input can be received to control visual elements displayed on the touch screen 605. The application can detect a connection 615 to an external display 610. To request permission, the application can display a message on the touch screen 605 indicating that the mobile device 600 detects a connection to an external display, and can display another message asking the user to provide input indicating whether the application should switch from the first display mode to the second display mode.

For example, the application can display the message, "SWITCH?", and display a "YES" button 607 and a "NO" button 609 in the user interface 605. The user can select the "YES" button 607, e.g., by touching the touch screen of the mobile device 600, thereby providing permission to switch. Upon receiving permission to switch, the mobile device 600 can switch the application from the first display mode to the second display mode. If the user selects the "NO" button 609 instead, the application can determine that the user has denied permission to switch display modes. In response, the mobile device 600 can continue to execute the application in the first display mode.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, which is generated to encode information for transmission to suitable receiver apparatus for execution by a data processing apparatus.

A computer storage medium (similar to the computer readable medium 184 shown in FIG. 1A) can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources. For example, the mobile device can include one or more computer-readable storage devices that store the computer software instructions. The mobile device can further include one or more data processing apparatuses that can read the computer software instructions from the computer-readable storage devices and execute them.

The term "data processing apparatus" encompasses all kinds of apparatus, devices, and machines for processing data, including by way of example a programmable processor, a computer, a system on a chip, or multiple ones, or combinations, of the them. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file, in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks.

However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few.

Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and SD cards, CD-ROM and DVD-ROM disks. The processor and the memory can be supplemented by, or incorporated in, special purpose logic circuitry.

While this specification contains many specific implementation details, these should not be construed as limitations on the scope of any disclosures or of what can be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

In the examples described above, the application executing on the mobile device is described as performing the operations such as detecting that the external display has been connected to or disconnected from the mobile device, and switching display modes based on the detecting. The operations can alternatively, or in addition, be performed by the mobile device on which the application is executing.

In other words, the mobile device can detect that the external display has been connected to the mobile device. Based on the detecting, the mobile device can switch the application executing on the mobile device from the first display mode to the second display mode. Subsequently, the mobile device can detect that the external display has been disconnected from the mobile device. In response, the mobile device can switch the application back to the first display mode.

In some implementations, when a user changes an orientation of the mobile device in a second display mode, for example, from portrait to landscape, the orientation of the visual elements displayed in the external display also correspondingly change, i.e., from portrait to landscape. In some implementations, if the mobile device is held in a portrait mode and the external display displays a visual element in a landscape mode, and the user changes the orientation of the mobile device from the portrait mode to a landscape mode, then the orientation of the visual element in the external display is changed from a landscape mode to a portrait mode. In such implementations, black boxes are displayed around the images displayed in the external display.

What is claimed is:

1. A computer-implemented method comprising:
providing, by the mobile device and for display on a touch screen of a mobile device, a first mobile user interface that includes a visual element and a first set of controls that are configured to control the visual element;
after providing the first mobile user interface, determining, by the mobile device, that the mobile device has established a local connection with an external display;
in response to determining, by the mobile device, that the mobile device has established a local connection with the external display, generating, by the mobile device, a second mobile interface that includes a selectable option to provide, by the mobile device, display data to the external display;
providing, by the mobile device and for display on the touch screen of the mobile device, the second mobile interface that includes the selectable option to provide display data to the external display;

receiving, by the mobile device, data indicating a user selection of the selectable option to provide, by the mobile device, display data to the external display;

in response to receiving, by the mobile device, the data indicating the user selection of the selectable option to provide display data to the external display, generating, by the mobile device, an external user interface that only includes the visual element;

in response to receiving, by the mobile device, the data indicating the user selection of the selectable option to provide display data to the external display, generating, by the mobile device, a third mobile user interface that:

includes (i) the first set of controls that are configured to control the visual element that is included in the external user interface and (ii) a second set of controls that are not included in the first mobile user interface and that are configured to control the visual element that is included in the external user interface differently than the first set of controls, and excludes the visual element that is included in the external user interface;

providing, by the mobile device and for display on the touch screen of the mobile device, the third mobile user interface;

providing, by the mobile device, over the local connection, and for display on the external display, the external user interface;

while providing by the mobile device, over the local connection, and for display on the external display, the external user interface, determining, by the mobile device, that a user has interacted with the third mobile user interface in a particular manner;

in response to determining that the user has interacted with the third mobile user interface in the particular manner, generating, by the mobile device, a fourth mobile user interface that:

includes a third, different set of controls (i) that are configured to control the visual element that is included in the external user interface differently than the first set of controls and the second set of controls and (ii) that include controls to switch the visual element that is included in the external interface between a satellite mode, a street view mode, and a map mode, and excludes the visual element that is included in the external user interface; and providing, by the mobile device, over the local connection, and for display on the touch screen of the mobile device, the fourth mobile user interface.

2. The method of claim 1, comprising:

determining that the external display has been disconnected from the mobile device;

in response to determining that the external display has been disconnected from the mobile device, providing, by the mobile device and for display on the touch screen of the mobile device, the first mobile user interface and stopping to provide, by the mobile device and for display on the external display, the external user interface.

3. The method of claim 2, comprising:

determining, by the mobile device, that the mobile device has established an additional local connection with the external display;

in response to determining, by the mobile device, that the mobile device has established the additional local connection with the external display, generating, by the mobile device, an additional second mobile interface that includes the selectable option to provide, by the mobile device, display data to the external display;

providing, by the mobile device and for display on the touch screen of the mobile device, the additional second mobile interface that includes the selectable option to provide, by the mobile device, display data to the external display;

receiving, by the mobile device, data indicating a user dismissal of the additional second mobile interface without selecting the selectable option to provide, by the mobile device, display data to the external display; and while the mobile device and the external display remain connected through the local connection, continuing to provide, by the mobile device and for display on the touch screen of the mobile device, the first mobile user interface without providing a user interface to the external display.

4. The method of claim 1, wherein:

the visual element that is included in the external user interface comprises a map, the first set of controls that are configured to control the map included in the external user interface comprises a panning control and a keyboard, the second set of controls that are configured to control the map included in the external user interface comprises scroll bars, the keyboard, and a text box, and the third set of control that are configured to control the map included in the external user interface comprises a zoom control, the panning control, and voice controls.

5. The method of claim 1, wherein the local connection is a direct wired data connection or a direct short range radio data connection.

6. The method of claim 1, wherein:

the first set of controls included in the first mobile user interface are a first size, and the second set of controls included in the second mobile user interface are a second size that is larger than the first size.

7. The method of claim 1, wherein the second mobile interface further includes a selectable option to not provide, by the mobile device, display data to the external display.

8. The method of claim 1, wherein determining, by the mobile device, that a user has interacted with the third mobile user interface in a particular manner comprises:

determining that the user has entered a geographic address into the third mobile user interface.

9. A system comprising:

one or more computers and one or more storage devices storing instructions that are operable, when executed by the one or more computers, to cause the one or more computers to perform operations comprising:

providing, by the mobile device and for display on a touch screen of a mobile device, a first mobile user interface that includes a visual element and a first set of controls that are configured to control the visual element;

after providing the first mobile user interface, determining, by the mobile device, that the mobile device has established a local connection with an external display;

in response to determining, by the mobile device, that the mobile device has established a local connection with the external display, generating, by the mobile device, a second mobile interface that includes a selectable option to provide, by the mobile device, display data to the external display;

providing, by the mobile device and for display on the touch screen of the mobile device, the second mobile interface that includes the selectable option to provide display data to the external display;

receiving, by the mobile device, data indicating a user selection of the selectable option to provide, by the mobile device, display data to the external display;

in response to receiving, by the mobile device, the data indicating the user selection of the selectable option to provide display data to the external display, generating, by the mobile device, an external user interface that only includes the visual element;

in response to receiving, by the mobile device, the data indicating the user selection of the selectable option to provide display data to the external display, generating, by the mobile device, a third mobile user interface that:

includes (i) the first set of controls that are configured to control the visual element that is included in the external user interface and (ii) a second set of controls that are not included in the first mobile user interface and that are configured to control the visual element that is included in the external user interface differently than the first set of controls, and excludes the visual element that is included in the external user interface;

providing, by the mobile device and for display on the touch screen of the mobile device, the third mobile user interface;

providing, by the mobile device, over the local connection, and for display on the external display, the external user interface;

while providing by the mobile device, over the local connection, and for display on the external display, the external user interface, determining, by the mobile device, that a user has interacted with the third mobile user interface in a particular manner;

in response to determining that the user has interacted with the third mobile user interface in the particular manner, generating, by the mobile device, a fourth mobile user interface that:

includes a third, different set of controls (i) that are configured to control the visual element that is included in the external user interface differently than the first set of controls and the second set of controls and (ii) that include controls to switch the visual element that is included in the external interface between a satellite mode, a street view mode, and a map mode, and excludes the visual element that is included in the external user interface; and providing, by the mobile device, over the local connection, and for display on the touch screen of the mobile device, the fourth mobile user interface.

10. The system of claim 9, wherein the operations further comprise:
determining that the external display has been disconnected from the mobile device;
in response to determining that the external display has been disconnected from the mobile device, providing, by the mobile device and for display on the touch screen of the mobile device, the first mobile user interface and stopping to provide, by the mobile device and for display on the external display, the external user interface.

11. The system of claim 9, wherein:
the visual element that is included in the external user interface comprises a map,
the first set of controls that are configured to control the map included in the external user interface comprises a panning control and a keyboard,
the second set of controls that are configured to control the map included in the external user interface comprises scroll bars, the keyboard, and a text box, and
the third set of control that are configured to control the map included in the external user interface comprises a zoom control, the panning control, and voice controls.

12. The system of claim 10, wherein the operations further comprise:
determining, by the mobile device, that the mobile device has established an additional local connection with the external display;
in response to determining, by the mobile device, that the mobile device has established the additional local connection with the external display, generating, by the mobile device, an additional second mobile interface that includes the selectable option to provide, by the mobile device, display data to the external display;
providing, by the mobile device and for display on the touch screen of the mobile device, the additional second mobile interface that includes the selectable option to provide, by the mobile device, display data to the external display;
receiving, by the mobile device, data indicating a user dismissal of the additional second mobile interface without selecting the selectable option to provide, by the mobile device, display data to the external display; and
while the mobile device and the external display remain connected through the local connection, continuing to provide, by the mobile device and for display on the touch screen of the mobile device, the first mobile user interface without providing a user interface to the external display.

13. The system of claim 9, wherein the local connection is a direct wired data connection or a direct short range radio data connection.

14. The system of claim 9, wherein:
the first set of controls included in the first mobile user interface are a first size, and
the second set of controls included in the second mobile user interface are a second size that is larger than the first size.

15. The system of claim 9, wherein the second mobile interface further includes a selectable option to not provide, by the mobile device, display data to the external display.

16. The system of claim 9, wherein determining, by the mobile device, that a user has interacted with the third mobile user interface in a particular manner comprises:
determining that the user has entered a geographic address into the third mobile user interface.

17. A non-transitory computer-readable medium storing software comprising instructions executable by one or more computers which, upon such execution, cause the one or more computers to perform operations comprising:
providing, by the mobile device and for display on a touch screen of a mobile device, a first mobile user interface that includes a visual element and a first set of controls that are configured to control the visual element;
after providing the first mobile user interface, determining, by the mobile device, that the mobile device has established a local connection with an external display;
in response to determining, by the mobile device, that the mobile device has established a local connection with the external display, generating, by the mobile device, a second mobile interface that includes a selectable option to provide, by the mobile device, display data to the external display;

providing, by the mobile device and for display on the touch screen of the mobile device, the second mobile interface that includes the selectable option to provide display data to the external display;

receiving, by the mobile device, data indicating a user selection of the selectable option to provide, by the mobile device, display data to the external display;

in response to receiving, by the mobile device, the data indicating the user selection of the selectable option to provide display data to the external display, generating, by the mobile device, an external user interface that only includes the visual element;

in response to receiving, by the mobile device, the data indicating the user selection of the selectable option to provide display data to the external display, generating, by the mobile device, a third mobile user interface that:

includes (i) the first set of controls that are configured to control the visual element that is included in the external user interface and (ii) a second set of controls that are not included in the first mobile user interface and that are configured to control the visual element that is included in the external user interface differently than the first set of controls, and excludes the visual element that is included in the external user interface;

providing, by the mobile device and for display on the touch screen of the mobile device, the third mobile user interface;

providing, by the mobile device, over the local connection, and for display on the external display, the external user interface;

while providing by the mobile device, over the local connection, and for display on the external display, the external user interface, determining, by the mobile device, that a user has interacted with the third mobile user interface in a particular manner;

in response to determining that the user has interacted with the third mobile user interface in the particular manner, generating, by the mobile device, a fourth mobile user interface that:

includes a third, different set of controls (i) that are configured to control the visual element that is included in the external user interface differently than the first set of controls and the second set of controls and (ii) that include controls to switch the visual element that is included in the external interface between a satellite mode, a street view mode, and a map mode, and excludes the visual element that is included in the external user interface; and providing, by the mobile device, over the local connection, and for display on the touch screen of the mobile device, the fourth mobile user interface.

18. The medium of claim 17, wherein the operations further comprise:

determining that the external display has been disconnected from the mobile device;

in response to determining that the external display has been disconnected from the mobile device, providing, by the mobile device and for display on the touch screen of the mobile device, the first mobile user interface and stopping to provide, by the mobile device and for display on the external display, the external user interface.

19. The medium of claim 17, wherein:

the visual element that is included in the external user interface comprises a map, the first set of controls that are configured to control the map included in the external user interface comprises a panning control and a keyboard, the second set of controls that are configured to control the map included in the external user interface comprises scroll bars, the keyboard, and a text box, and the third set of control that are configured to control the map included in the external user interface comprises a zoom control, the panning control, and voice controls.

20. The medium of claim 17, wherein the local connection is a direct wired data connection or a direct short range radio data connection.

21. The medium of claim 17, wherein:

the first set of controls included in the first mobile user interface are a first size, and the second set of controls included in the second mobile user interface are a second size that is larger than the first size.

22. The medium of claim 17, wherein the second mobile interface further includes a selectable option to not provide, by the mobile device, display data to the external display.

23. The medium of claim 17, wherein determining, by the mobile device, that a user has interacted with the third mobile user interface in a particular manner comprises:

determining that the user has entered a geographic address into the third mobile user interface.

* * * * *